US012682708B2

(12) United States Patent
Lemkemeyer et al.

(10) Patent No.: US 12,682,708 B2
(45) Date of Patent: Jul. 14, 2026

(54) CONTROL OF AN INFRASTRUCTURE

(71) Applicant: Bayerische Motoren Werke Aktiengesellschaft, Munich (DE)

(72) Inventors: Christian Lemkemeyer, Munich (DE); Thomas Wursthorn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/023,996

(22) Filed: Jan. 16, 2025

(65) Prior Publication Data

US 2025/0239120 A1     Jul. 24, 2025

(30) Foreign Application Priority Data

Jan. 23, 2024    (DE) ..................... 10 2024 101 807.0

(51) Int. Cl.
| | |
|---|---|
| *G07C 9/10* | (2020.01) |
| *B60W 30/06* | (2006.01) |
| *G07C 9/20* | (2020.01) |
| *H04L 9/32* | (2006.01) |

(52) U.S. Cl.
CPC .............. *G07C 9/10* (2020.01); *B60W 30/06* (2013.01); *G07C 9/20* (2020.01); *H04L 9/3247* (2013.01); *H04L 9/3271* (2013.01)

(58) Field of Classification Search
CPC ........ G07C 9/10; G07C 9/20; G07C 9/00309; B60W 30/06; H04L 9/3247; H04L 9/3271; H04L 2209/84
See application file for complete search history.

(56) References Cited

U.S. PATENT DOCUMENTS

| | | | | |
|---|---|---|---|---|
| 7,269,416 | B2 * | 9/2007 | Guthrie | .............. G07C 9/00182 455/418 |
| 8,384,513 | B2 * | 2/2013 | Witkowski | ............. G08C 17/02 340/5.7 |
| 8,437,916 | B2 * | 5/2013 | Fawaz | .................... G08C 17/02 455/418 |

(Continued)

FOREIGN PATENT DOCUMENTS

| | | | | |
|---|---|---|---|---|
| CA | 3220743 | A1 * | 12/2022 | ........... H04L 9/3228 |
| CA | 3222273 | A1 * | 12/2022 | ......... G07C 9/00857 |

(Continued)

OTHER PUBLICATIONS

DE-102023128011A1 Access control to resources, 14 pages. (Year: 2025).*

(Continued)

*Primary Examiner* — Tuyen K Vo
(74) *Attorney, Agent, or Firm* — Crowell & Moring LLP

(57) ABSTRACT

A method for controlling an infrastructure by a motor vehicle includes the steps of: transmitting a request to perform a predetermined function from the motor vehicle to the infrastructure; transmitting a challenge from the infrastructure to the motor vehicle; generating a response by signing the transmitted challenge with a private key of the motor vehicle; transmitting the response from the motor vehicle to the infrastructure; determining, based on a public key of the motor vehicle and the signature of the response, that the response originates from the motor vehicle; and controlling the requested function by the infrastructure if the check was successful.

12 Claims, 2 Drawing Sheets

(56)                    References Cited

U.S. PATENT DOCUMENTS

| | | | |
|---|---|---|---|
| 2011/0172885 A1* | 7/2011 | Fawaz .................... | G08C 17/02 |
| | | | 340/5.64 |
| 2017/0079082 A1 | 3/2017 | Papay | |
| 2018/0151006 A1* | 5/2018 | Huggins .................. | G07C 9/20 |
| 2020/0198620 A1* | 6/2020 | Nakata .............. | B60W 60/0053 |
| 2023/0322185 A1* | 10/2023 | Lerch ..................... | H04W 4/40 |
| | | | 340/10.5 |

FOREIGN PATENT DOCUMENTS

| | | | | |
|---|---|---|---|---|
| DE | 10 2016 006 189 A1 | 11/2017 | | |
| EP | 3350791 B1 * | 12/2020 | ........... | H04W 12/06 |
| WO | WO 2022/251558 A1 | 12/2022 | | |

OTHER PUBLICATIONS

German-language Search Report issued in German Application No. 10 2024 101 807.0 dated Oct. 2, 2024 with partial English translation (13 pages).

* cited by examiner

100

110

140

145

130

135

115

105    125    120

CONTROL OF AN INFRASTRUCTURE

CROSS REFERENCE TO RELATED APPLICATION

This application claims priority under 35 U.S.C. § 119 from German Patent Application No. DE 10 2024 101 807.0, filed Jan. 23, 2024, the entire disclosure of which is herein expressly incorporated by reference.

BACKGROUND AND SUMMARY OF THE INVENTION

The present invention relates to the control of an infrastructure. In particular, the invention relates to the control by the motor vehicle of an infrastructure usable by a motor vehicle.

A motor vehicle is set up to provide a predetermined function depending on a control by a mobile device. The predetermined function preferably comprises a safety function, in particular locking or unlocking a flap or door or releasing or blocking a drive motor. In other words, the safety function can secure the use of the motor vehicle and prevent unauthorized use. The mobile device preferably comprises a smartphone or similar device, which is preferably a personal device of a person. The mobile device can be assigned to the person, and in order to use the device or certain functions of the device, it may be necessary for the person to authenticate themselves to the mobile device. To do this, the person can, for example, present a secret or a biometric feature on the mobile device. The vehicle is controlled using a cryptographic procedure based on asymmetric cryptographic keys.

A technology known as the Digital Car Key, which is specified by the Car Connectivity Consortium, is preferred for implementation. A currently valid specification is available as "Digital Key Release 3" in version 1.1.0 from Jul. 20, 2022.

The standard Digital Car Key (DCK) is limited to controlling a function of a motor vehicle via a mobile device. Conversely, however, it is sometimes desirable for the motor vehicle to control an infrastructure. In particular, the infrastructure may comprise a resource that can be used by the motor vehicle. For example, the infrastructure may comprise a barrier or garage door that can enable or block access for the motor vehicle. An underlying object of the present invention is to provide an improved technique for controlling an infrastructure from a motor vehicle. The invention achieves this object by means of the subjects of the independent claims. Dependent claims indicate preferred embodiments.

According to a first aspect of the present invention, a method for controlling an infrastructure by a motor vehicle comprises the steps of transmitting a request to perform a predetermined function from the motor vehicle to the infrastructure; transmitting a challenge from the infrastructure to the motor vehicle; creating a response by signing the transmitted challenge with a private key of the motor vehicle; transmitting the response from the motor vehicle to the infrastructure; determining, based on a public key of the motor vehicle and the signature of the response, that the response originates from the motor vehicle; and controlling the requested function by the infrastructure if the check was successful.

According to the invention, an asymmetric cryptographic method can be used to enable the motor vehicle to control the infrastructure. This can increase the utility value of the motor vehicle for a person in it. The function can be controlled by the person or autonomously by the motor vehicle.

It is particularly preferable for the challenge-response method to be carried out in the same way as a digital car key. In contrast to a digital car key, however, the roles of the communicating partners are different here. While a mobile device controls a motor vehicle according to the DCK method, it is proposed that the motor vehicle controls the infrastructure. To carry out the method, a public key of the vehicle can be stored on the infrastructure. In addition, the infrastructure can be used to specify which function should be controllable by the motor vehicle. Such a setting can be changed at any time so that the vehicle's access to the infrastructure can be easily changed if necessary. In a further embodiment, the controllability of the function can be linked to an external condition. For example, a function can only be executed by a motor vehicle at certain times or only in a predetermined manner.

The infrastructure can be set up to be controlled by a large number of motor vehicles. Different vehicles can be granted different authorizations. In a further embodiment, the infrastructure can support different priorities, so that control of a first motor vehicle can take precedence over control of a second motor vehicle.

It is also preferred that an indication of a function that can be performed by the motor vehicle is transmitted from the infrastructure to the motor vehicle. This indication can precede the transmission of the request. A list of controllable functions can also be transmitted from the infrastructure to the motor vehicle. The list can generally specify controllable functions or only those functions that are controllable in a given context. The given context may, for example, relate to an external condition or the identity of the motor vehicle. For example, a motor vehicle that is not allowed to control a predetermined function of the infrastructure cannot receive an indication of the existence of this function.

An indication of a function that can be controlled by the vehicle on an infrastructure can be transmitted from the vehicle to the infrastructure. Several controllable functions can also be specified here, for example in a list.

The infrastructure can compare the functions that can be controlled by the motor vehicle with functions that can be executed by the infrastructure. In one possible embodiment, the infrastructure can return to the motor vehicle an indication of a function that can be controlled by both the motor vehicle and the infrastructure. In another embodiment, based on the list of controllable functions received from the infrastructure, the motor vehicle can select one that can be controlled by the motor vehicle. In both variants, it can be ensured that the function of the infrastructure requested for execution is supported by both the motor vehicle and the infrastructure.

The function can be controlled automatically by the motor vehicle when the motor vehicle assumes a predetermined position. In one embodiment, the motor vehicle determines a position of the motor vehicle relative to the infrastructure. The function can then be controlled depending on the determined position. In addition to the position, an orientation of the motor vehicle with respect to the infrastructure can also be taken into account. A combination of position and orientation can be called a pose. In yet another embodiment, a movement pattern of the motor vehicle in relation to the infrastructure can also be evaluated. The movement pattern may include, for example, traveling along a predetermined line or trajectory or stopping within a predetermined area. The function can be controlled automatically when the motor vehicle performs the predetermined movement pattern with respect to the infrastructure.

Communication between the motor vehicle and the infrastructure is preferably carried out using Bluetooth Low Energy (BLE) or another Bluetooth variant. BLE is advantageously available over distances of at least 10 to approximately 100 m, so that long-range or early control of the infrastructure is possible. For example, the opening of a garage door can be initiated while the motor vehicle is still some distance away. By the time the motor vehicle reaches the garage door, it may already be fully open so that the motor vehicle does not have to stop and can drive through.

In addition, BLE can support the determination of a distance and/or direction of the infrastructure in relation to the motor vehicle or vice versa. In a simple embodiment, a signal strength or a received signal direction can be evaluated for this purpose. In another embodiment, the direction or distance can be determined using channel sounding on the basis of the propagation time of a signal between the motor vehicle and the infrastructure. For this purpose, several transceiver units can be provided on the part of the motor vehicle and/or on the part of the infrastructure. By determining propagation times between different transceivers of the two communication partners, both a direction and a distance can be determined. An achievable determination accuracy can be high.

A function that can be executed by the infrastructure or controlled by the vehicle can include, in particular, opening or closing a driveway, raising or lowering a duplex garage, granting access to a wireless data node (hotspot), lighting, a defrost function or an automatic parking function. The lighting can affect the infrastructure or an area near the infrastructure, such as an access road or driveway. In one embodiment, the defrosting function can be used to defrost an iced-up vehicle that has arrived in the infrastructure, for example a garage. In such an embodiment variant, the infrastructure can control the motor vehicle. In another embodiment, the defrost function can be used to defrost an access road to the infrastructure before the motor vehicle leaves the infrastructure via the access road. The automatic parking function can ensure that the motor vehicle is parked at a predetermined point on the infrastructure. This is particularly advantageous in conjunction with a single garage, an underground garage, a duplex garage, a parking lot or another parking facility. In such an embodiment variant, the motor vehicle can control the infrastructure According to a further aspect of the present invention, a first device for controlling an infrastructure comprises a wireless communication unit for communicating with a motor vehicle, an actuator for controlling a predetermined function, and a processing unit. The processing unit is set up to receive a request to perform a predetermined function of the infrastructure from a motor vehicle; to transmit a challenge to the motor vehicle; to receive a response in the form of a signed challenge; and to determine, based on the signature of the response and a public key of the motor vehicle, that the signature of the response is associated with the motor vehicle. In this case, the actuator can be controlled to perform the requested function.

If it is determined that the signature is not assigned to the vehicle, the response was not created on the basis of the challenge, or the key of the vehicle is invalid, execution of the function can be refused.

According to yet another aspect of the present invention, an infrastructure comprises a first device described herein.

According to yet another aspect of the present invention, a second device on board a motor vehicle comprises a wireless communication unit for communicating with an infrastructure and a processing unit. The processing unit is set up to transmit a request to perform a predetermined function of the infrastructure to the infrastructure; to receive a challenge from the infrastructure; to generate a response in the form of a signed challenge; to transmit the response to the infrastructure; and optionally to control the predetermined function of the infrastructure.

In one embodiment, no further intervention by the second device on board the motor vehicle is required to control the function of the infrastructure. In another embodiment, the control may comprise the exchange of control messages in one or both directions. For example, the execution of a started function can be canceled by the motor vehicle transmitting a corresponding control message to the infrastructure. The existing authentication can be used for this purpose, or a new authentication can be carried out.

A motor vehicle comprises a device described herein. In particular, the motor vehicle may comprise a motorcycle or a passenger car. In a further embodiment, the motor vehicle may also comprise, for example, a truck, a bus or an agricultural machine.

In addition, a system is proposed comprising a motor vehicle described herein and an infrastructure described herein.

A method described herein can be carried out in particular in cooperation between two devices described herein. For this purpose, a device may comprise an electronic processing unit comprising in particular an integrated circuit, a programmable logic device or a programmable microcomputer.

The method can be implemented in the form of a configuration or as a computer program product with program code means for the processing unit. The configuration or the computer program product can be stored on a computer-readable data carrier. Features or advantages of the method can be transferred to the device, or vice versa.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
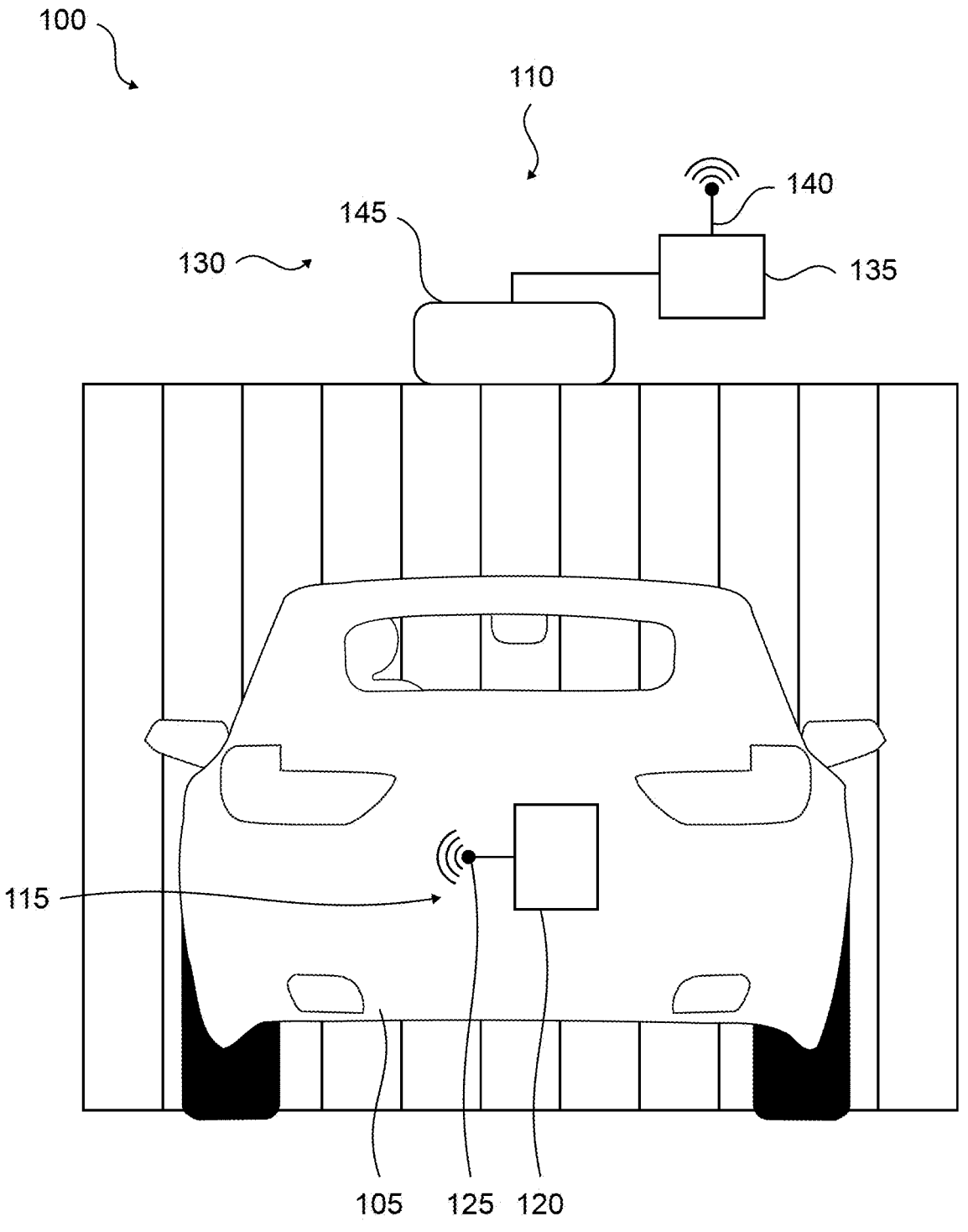
FIG. 1 illustrates a system.

FIG. 1 shows a system 100 comprising a motor vehicle 105 and an infrastructure 110. The motor vehicle is shown as a passenger car by way of example. The infrastructure 110 can be used by the motor vehicle 105 and is shown purely by way of example as a garage door. In general, the infrastructure 110 can preferably be used directly by the motor vehicle 105. For this purpose, a predetermined function can be executed on the infrastructure 110, which enables or prevents or implements use. For example, the garage door may be opened or closed to enable or prevent use of the infrastructure 110. In another embodiment, the function may facilitate or enhance use of the infrastructure 110 by the motor vehicle 105, for example, the controllable function may include activating a heat source for defrosting or turning on a light. In yet another embodiment, a complex function of the infrastructure 110 may be controlled by the motor vehicle 105. This function may include, for example, parking the motor vehicle 105 in a parking space managed by the infrastructure 110. In a further embodiment, the infrastructure 110 comprises a lifting or transport device. The infrastructure 110 may be set up to control the motor vehicle 105.

A first device 115 is provided on board the motor vehicle 105 and comprises a processing unit 120 and a wireless communication unit 125. Similarly, a second device 130 is provided on the infrastructure 110 and comprises a processing unit 135 and a wireless communication unit 140. In addition, an actuator 145 is preferably provided on the second device 130 or the infrastructure 110 and is set up to control or perform a predetermined function of the infrastructure 110.

The communication units 125, 140 are set up to establish a wireless communication link so that communication between the motor vehicle 105 and the infrastructure 110 is possible. Preferably, BLE technology is used, which is supported on both sides. It is preferred that a BLE version is used that additionally supports the determination of a relative position of the motor vehicle 105 with respect to the infrastructure 110. For example, BLE version 5.4 or higher can be used. The relative position can also be determined using another wireless communication technology, for example ultra wide band (UWB).

The devices 115, 130 are set up to perform challenge-response authentication in the manner of a digital car key. In contrast to the digital car key, however, the challenge is not provided by the motor vehicle 105, but by the infrastructure 110. A suitable response can be provided by the motor vehicle 105 and transmitted back. A function requested by the motor vehicle 105 at the infrastructure 110 can only be executed if the challenge-response method has been successfully completed and the infrastructure 110 has determined that the motor vehicle 105 is authorized to control the requested function or to request the function.

Figure 2:
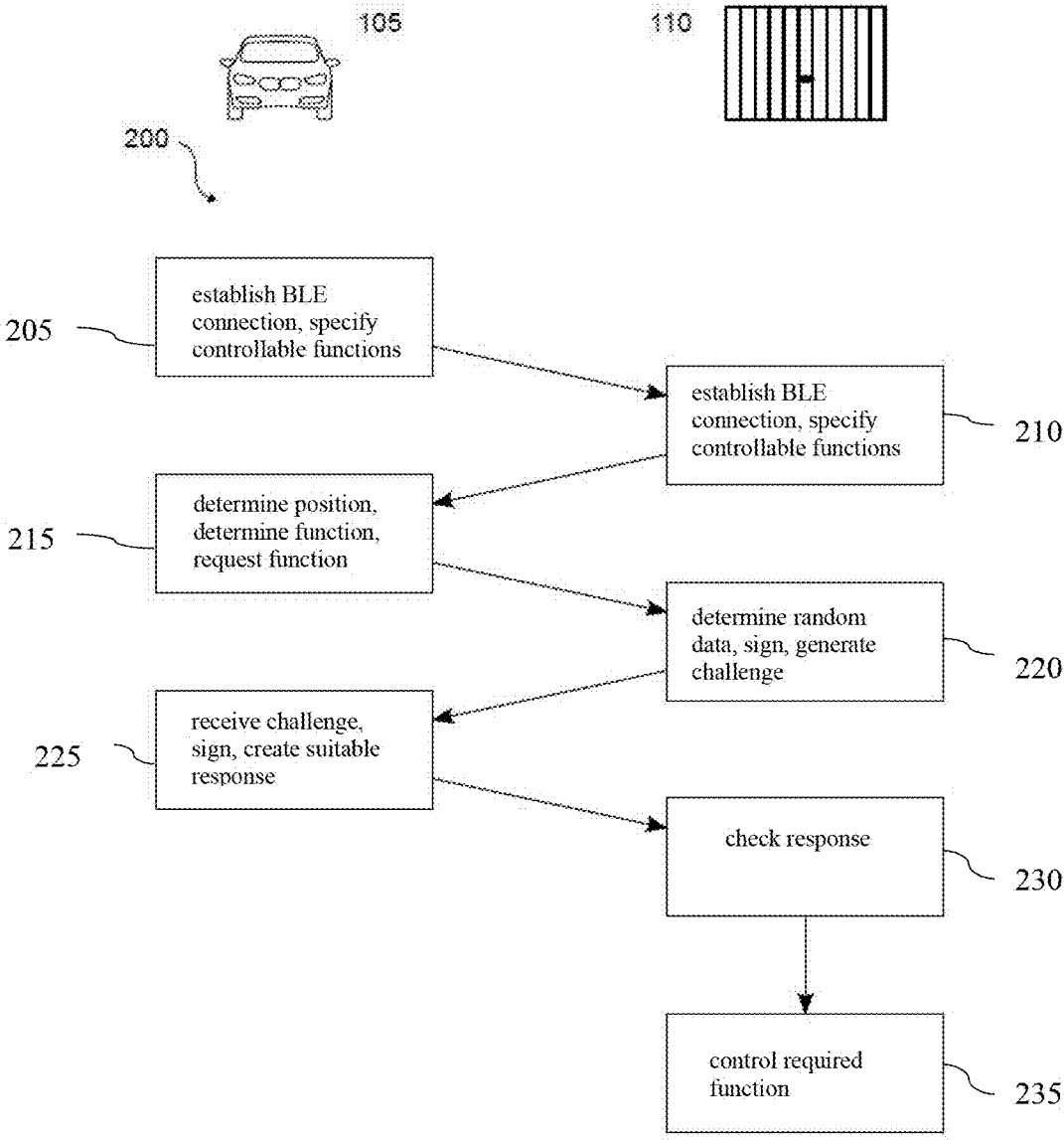
FIG. 2 illustrates a flow chart of a first method.

FIG. 2 shows a flow chart of a method 200 for controlling an infrastructure 110 by a motor vehicle 105. The method 200 can be carried out in particular in the context of a system 100. For better understanding, steps that are preferably performed by the motor vehicle 105 are shown in a left-hand area, and steps that are preferably performed by the infrastructure 110 are shown in a right-hand area. Before the start of the method 200, it is assumed that a public key of the motor vehicle 105 is stored by the infrastructure 110 or can be accessed in another way, for example by a corresponding information service.

In a step 205, the motor vehicle 105 may establish a BLE connection to the infrastructure 110 and optionally specify one or more functions that the motor vehicle 105 may control at an external infrastructure 110.

In a step 210, the infrastructure 110 may also establish the BLE connection and receive the list of controllable functions. The received list may be compared with an internal list of available functions so that such functions can be determined that can be both controlled by the motor vehicle 105 and provided by the infrastructure 110. A corresponding list may be transmitted to the motor vehicle 105 in step 210. If no indication of a function controllable by the motor vehicle 105 at an external infrastructure 110 has been transmitted to the infrastructure 110 in step 205, the infrastructure 110 can provide a list of all controllable functions in step 210. Alternatively, the infrastructure 110 may be limited to providing an indication of controllable functions.

In a step 215, a position relative to the infrastructure 110 can be determined by the motor vehicle 105. In particular, the BLE connection to the infrastructure 110 can be used for this purpose. The position is preferably determined as distance and direction. For this purpose, several transceivers can be provided on the part of the motor vehicle 105 and/or on the part of the infrastructure 110. One side 105, 110 can now transmit signals in a fixed time sequence via different ones of its transceivers, and the other side 105, 110 can receive the signals again. The transmitting transceivers are spaced apart, so that geometric distances to a receiving transceiver are different. Slight deviations in reception times of the signals from the known temporal grid can be used to determine geometric relationships between the transmitting and a receiving transceiver. The direction and distance can be determined from this information. In one embodiment, the determination is made by the motor vehicle 105, in another by the infrastructure 110. In this case, it is preferred that the determined relative position is subsequently transmitted to the motor vehicle 105.

Based on the determined position, a pose, a movement pattern completed by the motor vehicle 105 with respect to the infrastructure 110, and/or another condition, the motor vehicle 105 may request execution of a function in step 215. The function is preferably determined to be supported by both the motor vehicle 105 and the infrastructure 110.

In a step 220, the infrastructure 110 may receive the request to execute the function. However, before the function is controlled, a challenge-response method may be performed, which typically begins with the infrastructure 110 determining data that is signed using a cryptographic key. The data is preferably random data or pseudo-random data generated by the infrastructure 110.

The signed data is also called a challenge. In step 220, the challenge can be transmitted to the motor vehicle 105.

In a step 225, the motor vehicle 105 can receive the challenge and sign it using its own private key. In this way, a suitable response is created, which can only originate from the motor vehicle 105 due to the signature. The response provided can be transmitted to the infrastructure 110 in step 225.

In a step 230, the infrastructure 110 can check the response. For this purpose, the signature can be decrypted or verified using a public key of the motor vehicle 105. If the verification is successful, it is clear that the infrastructure 110 is communicating with precisely the motor vehicle 105 whose public key is stored with it. It is also ensured that the communication cannot have been intercepted or manipulated by a third party en route.

If the check is successful, the requested function can be controlled by the infrastructure 110 in a step 235. In the example of FIG. 1, a garage door opener 145 can be controlled to open or close the garage door shown. In a more complex example, the function can now be controlled by the motor vehicle 105.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 100 system
105 motor vehicle
110 infrastructure
115 first device
120 processing unit

125 wireless communication unit
130 second device
135 processing unit
140 wireless communication unit
145 actuator
200 method
205 establish BLE connection, specify controllable functions
210 establish BLE connection, specify controllable functions
215 determine position, determine function, request function
220 determine random data, sign, generate challenge
225 receive challenge, sign, create suitable response
230 check response
235 control required function

What is claimed is:

1. A method for controlling an infrastructure by a motor vehicle, comprising:

transmitting, by the motor vehicle to the infrastructure, a request for the infrastructure to perform a predetermined function of the infrastructure;

transmitting a challenge from the infrastructure to the motor vehicle;

creating, at the motor vehicle, a response by signing the transmitted challenge with a private key of the motor vehicle;

transmitting the response from the motor vehicle to the infrastructure;

determining, by the infrastructure and based on a public key of the motor vehicle and the signature of the response, that the response originates from the motor vehicle; and executing the function by the infrastructure upon the infrastructure determining that the response originates from the motor vehicle.

2. The method of claim 1, wherein the challenge-response method is performed in the manner of a digital car key.

3. The method of claim 1, wherein an indication that the function is executable by the infrastructure is transmitted from the infrastructure to the motor vehicle.

4. The method of claim 1, wherein an indication that the function is controllable by the motor vehicle is transmitted from the motor vehicle to the infrastructure.

5. The method of claim 3, wherein the function to be controlled is supported by both the motor vehicle and the infrastructure.

6. The method of claim 1, wherein the function is determined based on a position of the motor vehicle relative to the infrastructure as determined by the motor vehicle.

7. The method of claim 1, wherein communication between the motor vehicle and the infrastructure takes place via a wireless personal area network.

8. The method of claim 1, wherein the function includes at least one of: opening a driveway, closing the driveway, raising a duplex garage, lowering the duplex garage, granting access to a wireless data node, a lighting function, a defrost function, and an automatic parking function.

9. A device of an infrastructure, comprising:

a wireless communication unit for communicating with a motor vehicle;

a processing unit configured to:

receive, via the wireless communication unit, a request sent from the motor vehicle to perform a predetermined function of the infrastructure;

transmit, via the wireless communication unit, a challenge to the motor vehicle;

receive, via the wireless communication unit, a response from the motor vehicle in the form of a signed challenge; and determine, based on the signature of the response and a public key of the motor vehicle, that the signature of the response is associated with the motor vehicle; and an actuator configured to execute the function upon the determination that the signature of the response is associated with the motor vehicle.

10. An infrastructure comprising the device of claim 9.

11. A device on board a motor vehicle, the device comprising:

a wireless communication unit for communicating with an infrastructure;

a processing unit operatively configured to control a predetermined function of the infrastructure via:

transmitting a request to the infrastructure to perform a predetermined function of the infrastructure;

receiving a challenge from the infrastructure;

generating a response in the form of a signed challenge; and transmitting the response to the infrastructure;

wherein the response is configured to cause the infrastructure to execute the predetermined function.

12. A motor vehicle comprising the device of claim 11.

* * * * *